(12) United States Patent
Seidel et al.

(10) Patent No.: US 9,694,405 B2
(45) Date of Patent: Jul. 4, 2017

(54) HOT-ROLLING MILL

(71) Applicant: SMS Group GmbH, Duesseldorf (DE)

(72) Inventors: Juergen Seidel, Kreuztal (DE); Volker Kunze, Siegen (DE); Matthias Kipping, Herdorf (DE); Peter Sudau, Hilchenbach (DE)

(73) Assignee: SMS GROUP GMBH, Duesseldorf (DE)

( * ) Notice: Subject to any disclaimer, the term of this patent is extended or adjusted under 35 U.S.C. 154(b) by 0 days.

(21) Appl. No.: 14/888,522

(22) PCT Filed: May 2, 2014

(86) PCT No.: PCT/EP2014/058963
§ 371 (c)(1),
(2) Date: Dec. 4, 2015

(87) PCT Pub. No.: WO2014/177679
PCT Pub. Date: Nov. 6, 2014

(65) Prior Publication Data
US 2016/0082490 A1    Mar. 24, 2016

(30) Foreign Application Priority Data

May 3, 2013  (DE) .................. 10 2013 208 092
Sep. 27, 2013 (DE) .................. 10 2013 219 507

(51) Int. Cl.
*B21B 45/02* (2006.01)
*B21B 45/00* (2006.01)
*B21B 13/00* (2006.01)

(52) U.S. Cl.
CPC ............ *B21B 45/008* (2013.01); *B21B 13/00* (2013.01); *Y02P 70/127* (2015.11)

(58) Field of Classification Search
CPC ... B21B 45/008; B21B 45/02; B21B 45/0203; B21B 45/0209; B21B 45/0218;
(Continued)

(56) References Cited

U.S. PATENT DOCUMENTS 3,344,648 A * 10/1967 Richardson ........... B21B 45/008
                                                72/11.3
3,606,778 A *  9/1971 Bomberger ............... B21B 1/34
                                                219/155

(Continued)

FOREIGN PATENT DOCUMENTS

CN       201644499        11/2010
DE   102009032723 A1 *  1/2011 ........... B21B 45/008
(Continued)

OTHER PUBLICATIONS

Translation of WO 02/079523 A1, Oct. 10, 2002.*

*Primary Examiner* — Edward Tolan
(74) *Attorney, Agent, or Firm* — Abelman, Frayne & Schwab

(57) ABSTRACT

The invention concerns a hot-rolling mill comprising a finishing train (1) for finishing rolling stock, in particular a strip, the finishing train (1) comprising a number of rolling stands (2, 3, 4) which follow one another in a conveying direction (F) of the rolling stock. According to the invention, in order to improve the rolling force level during finishing, there is disposed at least between two rolling stands (2, 3, 4), following one another in the conveying direction (F), at least one heat-insulating element (5) by means of which the rolling stock can be protected from heat losses.

25 Claims, 2 Drawing Sheets

Figure 1:
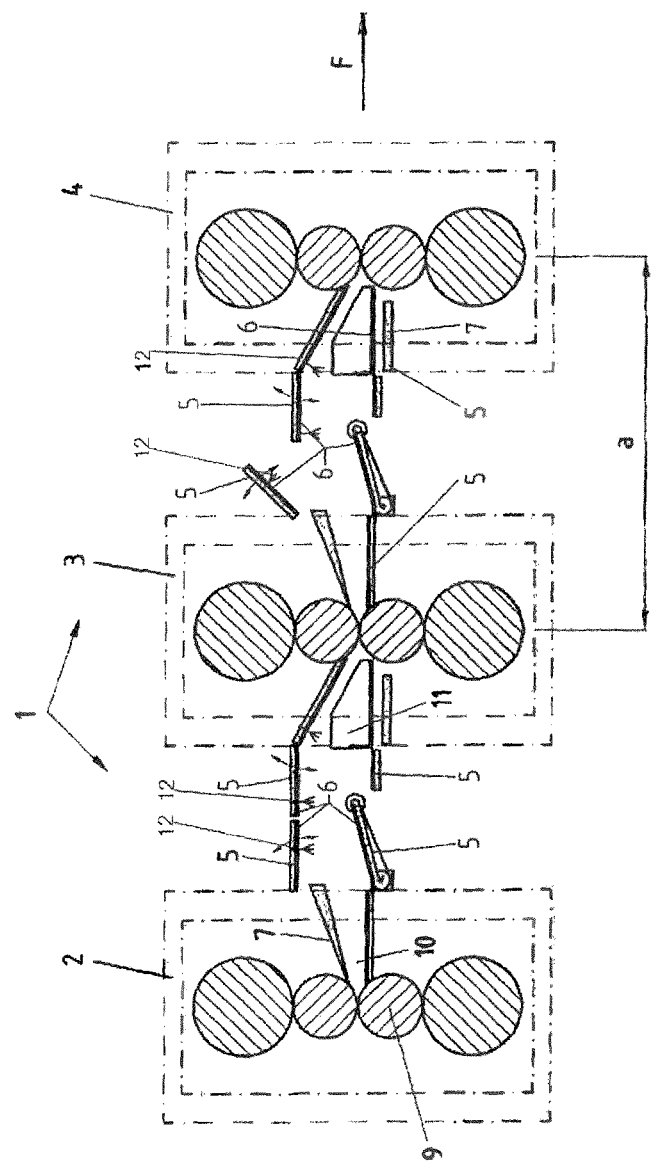

(58) Field of Classification Search
CPC ............ B21B 45/0269; B21B 45/0275; B21B 45/0287; Y02P 70/127; B21L 31/26; C21D 1/42; C21D 8/0226
See application file for complete search history.

(56) References Cited

U.S. PATENT DOCUMENTS

| | | | |
|---|---|---|---|
| 4,343,168 A | | 8/1982 | Laws |
| 4,382,586 A | * | 5/1983 | Reese ...................... C21D 1/84 266/259 |
| 4,434,168 A | | 2/1984 | Holaday |
| 4,452,587 A | * | 6/1984 | Laws ........................ B21B 1/26 165/135 |
| 4,527,409 A | * | 7/1985 | Ouwerkerk ........... B21B 45/008 72/202 |
| 4,595,358 A | | 6/1986 | Ginzburg |
| 4,811,588 A | * | 3/1989 | Watson ................. B21B 45/008 72/202 |
| 5,101,652 A | * | 4/1992 | Burk ..................... B21B 45/008 72/200 |
| 7,677,072 B2 | * | 3/2010 | Denker ............... B21B 45/0278 72/236 |
| 2006/0156778 A1 | * | 7/2006 | Ondrovic ................ B21B 37/32 72/201 |
| 2010/0212856 A1 | * | 8/2010 | Rosenthal ................. B21B 1/46 164/493 |
| 2013/0263634 A1 | | 10/2013 | Seidel |

FOREIGN PATENT DOCUMENTS

| | | | | |
|---|---|---|---|---|
| EP | 0059093 | | 9/1982 | |
| FR | 2630533 | | 10/1989 | |
| GB | 2163985 | | 3/1986 | |
| JP | 61-71121 | | 4/1986 | |
| JP | 0275411 | | 3/1990 | |
| JP | 06-315708 A | * | 11/1994 | ............ B21B 39/12 |
| WO | 02/079523 A1 | * | 10/2002 | ................ C21D 1/42 |
| WO | 2012080368 | | 6/2012 | |

* cited by examiner

HOT-ROLLING MILL

The invention relates to a hot rolling mill having a finishing train for finish-rolling a rolled stock, in particular a strip, wherein the finishing train has a number of rolling stands following each other in a conveying direction of the rolling stock.

Hot thick and thin slabs, sheets, or strips release energy into environment during transportation. In order to reduce loss of temperature, heat insulation hoods are used which are arranged above, below, or adjacent to the hot product. It is known to provide heat insulation hoods for a rolling table between the roughing train and the finishing train in a hot strip path. To this end, reference is made to EP 0 005 340 B1, EP 0 059 093 B1, U.S. Pat. No. 4,595,358, and U.S. Pat. No. 5,711,175 which describe corresponding heat insulation elements. These publications also describe how the heat insulation elements can be formed to make them more efficient and robust.

The object of the invention is to so modify the hot rolling mill that the strip temperature and rolling force level during finish-rolling can be improved.

The object of the invention is achieved, according to the invention, by a hot rolling mill characterized in that at least between two, following each other in the conveying direction, rolling stands, at least one heat insulation element is arranged that can shield the rolled stock from heat losses.

Preferably, heat insulation elements are provided between all of the rolling stands. The distance between two stands in the conveying direction amounts to less than 25 m, preferably, less than 7 m.

At that, advantageously, a region a length of which amounts to at least 25% of a distance (a) between two rolling stands, is provided with the at least one heat insulation element. However, practically, the entire distance between the rolling stands is provided with heat insulation elements.

The at least one heat insulation element or a portion thereof is directly mounted on a rolling stand, or is integrated therein, or is mounted on a stand chock.

Between the heat insulation element and the rolling stock or next to the heat insulation element, at least one protection element, in particular in form of a rib or a strip, can be arranged. The protection element can be connected with the heat insulation element. A plurality of protection elements, which are connected with each other, can be provided. Advantageously, the at least one protection element is formed of a heat-resistant material.

The at least one protection element can be provided with cooling means. A plurality of protection elements can be provided between the rolling stands, wherein the protection elements, that follow each other in the conveying direction between two rolling stands, are offset relative to each other in a width direction of the rolling stock.

The protection elements can extend linearly and/or form an angle in the conveying direction, preferably, an angle between 0° and 45°.

The at least one heat insulation element can be arranged so that it can be displaced pivotally or translationally.

The region between two rolling stands is preferably free of a roller table. At a larger distance between the stands, regions outside of the stand can be provided with roller tables. However, advantageously, the region between two stands can be provided with a bridge table, guide table and/or a looper.

In the region of the at least one heat insulation element, air blow-off means or water spray-off means can be arranged.

The at least one heat insulation element is formed, preferably, of a ceramic material or the like.

The at least one insulation element can further be provided with a protective sheet to protect it from water.

The heat insulation element is advantageously an absorption insulation element or a reflection heat insulation element.

At a relatively small distance between stands, the stand chocks are so formed that heat insulation hubs can be integrated therein. The heat insulation means is arranged at least between two stands the distance between which is less than 25 m, preferably, less than 7 m. The heat insulation means is mounted in stand components such as, e.g., bridge table, looper table, inlet and outlet guides, holding means for stripper or water guard, frames on the upper and/or lower sides of the strip, and/or sidewise of the strip, or is integrated therein.

For protection of the heat insulation element from destruction by a contact with a strip (ski-up, ski-down, rolling deficiencies), ribs or strips can be secured at a certain distance over the width on the stand built-in elements or be arranged between the built-in elements, with the heat insulation hoods being placed beneath or between the ribs or strips. The ribs or strips should foster guidance or transportation of the strip from stand to stand.

The ribs or strips consist of a heat-resistant material or are cooled from below. They can be colder or be tempered differently than the heat insulation elements arranged therebetween.

The ribs or strips can be so arranged, together with the heat insulation elements, that over the width, as uniform as possible heat insulation is achieved. In order to insure such as uniform as possible, heat insulation over the strip width and/or to prevent or spread local cooling, which results from eventually colder ribs or strips, advantageously, an offset arrangement of the ribs over the width form stand to stand or form a bridge table to another rib-containing component, and from upper side to lower side is provided.

Alternatively or in addition to the offset arrangement, the ribs or strips can be inclined with respect to the rolling direction (as seen in the plan view), i.e., arranged at an angle to insure the above-mentioned uniformity over the width.

If needed, heat insulation panels can be schwang away, e.g., in order to insure monitoring of the strip head during transportation between stands or scrap areas. Also, heat-insulated inlet and outlet guides can be moved out from the stand region (roll region) for changing the rolls.

Heat insulation between stands is used, advantageously, in a rolling mill which is used in addition to a batch operation, also for continuous rolling (when the casting installation and rolling installation are connected). Here, the heat insulation has a particular positive effect on increase of the end rolling temperature and/or on reduction of energy consumption which results form a smaller energy requirement in front of and within the finishing train. This effect is particularly important and advantageous at a product-mass flow (defined as a product of the rolled stock thickness and the speed) of less than 650 mm×m/min and is particularly advantageous at a mass flow of less than 500 mm×m/min.

Between the stands, preferably, no rolling table is provided, but rather insulated bridge tables, guide tables, or loopers are used.

Also, air blow-off means and/or water spray-off means can be provided in order to keep the region with heat insulation (in particular on the lower side) away from water. It is further possible to provide the components in this region with cooling.

The head insulation hoods which, preferably, include ceramic insulation, can so be covered with a protective sheet and/or be secured on the back side of a fame (e.g., a stripper holder) that water, e.g., of the between-stand cooling or roll cooling, is kept away therefrom.

The heat insulation panels are formed modular and interchangeable alone or together with the stand built-ins.

The insulated region between the finishing stands is, advantageously so maximized, that more than 25% of the space between the stands is insulated.

E.g., the between-stand cooling is integrated in the looper drive shaft. Also, side guides can be adjusted with displacement elements displaceable through bores formed in or through the stands or are provided beneath the guides between the stands.

The effect of the insulation hoods within the finishing train is optimized. E.g. thick introduceable strips which heat the insulation hoods, are provided. At that, sometimes, the number of active stands can be reduced in order to achieve an adequate high end rolling temperature. Also, the strips with non-critical temperature can serve as lead strips. Subsequently, thinner strips are rolled or/and strips which require a high end rolling temperature and which optimally use the heated insulation hoods.

The effect of heat insulation hoods within the finish train is preferably determined, based on the process model for setting the train (reduction distribution, motor load, rolling force, speed, temperature, etc.). Here, in particular, dynamic changes of the temperature condition of the heat insulation hood surfaces during rolling and, if necessary, during break time, as well as ratio of the surface of the ribs or strips to the surface of the heat insulation surface is factored in.

As a heat insulation, an absorption insulation when the heat insulation surface is heated to a high temperature, can be used. A reflection insulation is also possible when the radiation heat is reflected.

It proved to be very advantageous that with the inventive implementation, within a hot rolling train with multiple stand, the rolling force can be positively influenced as a result of reduction of the temperature losses. Equally, the heat losses are reduced and strip temperature balance is positively influenced.

Sometimes, the roll stands distinguish constructively from each other or are offset relatively to each other and, therefore, terminologically are divided in roughing train and finishing train.

When a multi-stand roughing train is used which meets the above-specified conditions, corresponding insulation hoods are also used within the roughing train.

In the specification and claims the term "finishing train" is used. However, if a roughing train has characteristics of the specified finishing train and consists of stands with a corresponding small distance between adjacent stands, the scope of protection also covers the above-mentioned roughing train or other mentioned stands.

Figure 2:
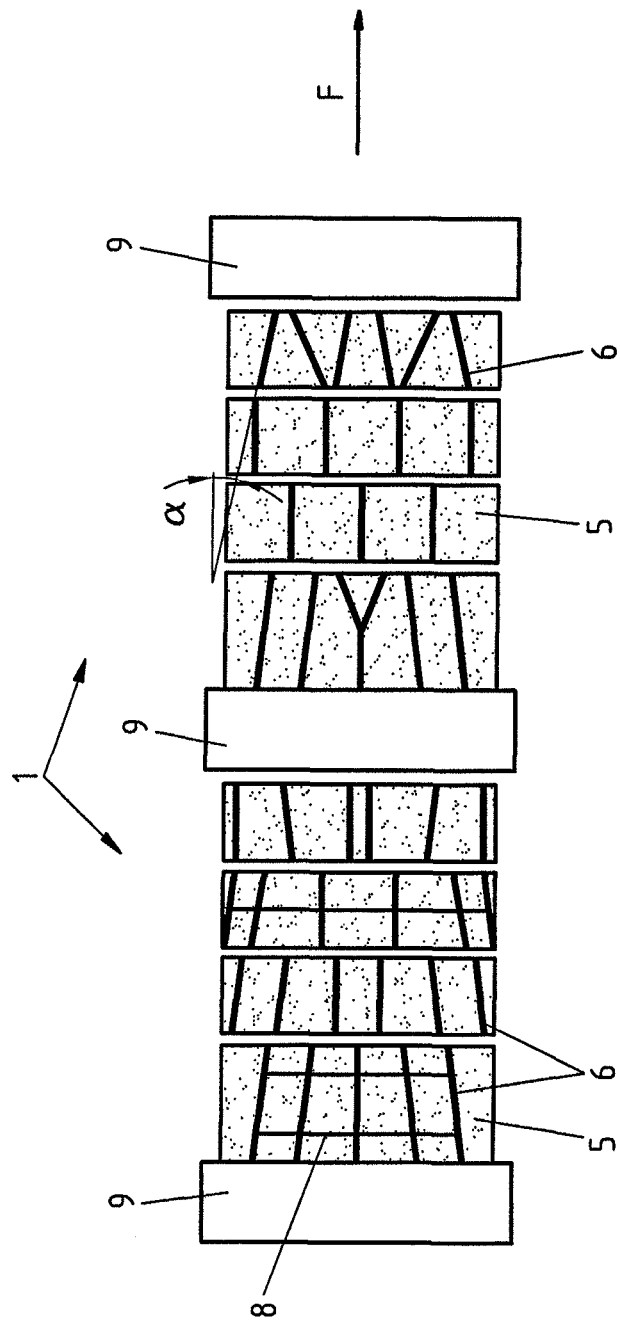

The drawings show an embodiment of the invention. It is shown in:

FIG. 1 a schematic side view of a portion of a finishing train of a hot rolling mill; and FIG. 2 a corresponding plan view.

The drawing figures show a section of a finishing train 1 with three rolling stands 2, 3 and 4. Each of the rolling stands 2, 3 and 4 has a pair of work rolls 9 and supporting them back-up rolls. The rolling stands 2, 3 and 4 follow each other in conveying direction F and roll a strip which is not shown.

To protect the heat insulation element 5 from water, air blow-off means and/or water spray-off means 12 are (is) provided in the region of the heat insulation element 5.

It is essential that between each two, following one another in the conveying direction, stands 2, 3 or 3, 4, there is provided a heat insulation element 5. The heat insulation elements shield the strip, preventing heat losses.

The heat insulation elements 5 can be provided with a protective sheet (cover sheet) 7, to protect them from water. The protective metal sheet 7 serves as a water-deflector.

A farther advantageous feature consists in that the heat insulation elements 5 are provided with protection elements 6 in form of ribs which, on one hand, stabilize them and, on the other hand, protect them from collision with the rolled strip.

As particularly shown in FIG. 2, the ribs 6 are arranged symmetrically with respect to the middle of the strip. Simultaneously, there is provided an offset in a width direction with respect to the sequence of the heat insulation elements 5 in the conveying direction F. This makes a uniform thermal process possible.

For reinforcement, there are further provided cross-bars 8 for connecting the ribs 6. This stabilizes the entire structure. The ribs 6 can extend at an angle α in the conveying direction F, as shown in FIG. 2.

Arrows in FIG. 1 show that the heat insulation elements 5 can be pivotally arranged so that they can be displaced outwardly, if needed, from their operational position.

The heat insulation elements 5 can be arranged also in the region of outlet guides 10 and inlet guides 11 to efficiently thermally insulate these sections also.

LIST OF REFERENCE NUMERALS

1 Finishing train
2 Rolling stand
3 Rolling stand
4 Rolling stand
5 Heat insulation element
6 Protection element (ribs strips)
7 Protective sheet
8 Cross-bar
9 Work roll
10 Outlet guide
11 Inlet guide
F Conveying direction
a Distance between the rolling stands
α Angle

The invention claimed is:

1. A hot rolling mill, comprising a finishing train (1) for finish-rolling a rolled stock, in particular a strip, wherein the finishing train (1) has a number of rolling stands (2, 3, 4) following each other in a conveying direction (F) of the rolling stock, wherein
at least between two, following each other in the conveying direction (F), rolling stands (2, 3, 4), at least one heat insulation element (5) is arranged that can shield the rolled stock from heat losses,
characterized in that
air blow-off means and/or water spray-off means are (is) provided in a region of the at least one heat insulation element (5) for protecting the heat insulation element from water.

2. A hot rolling mill according to claim 1, characterized in that heat insulation elements (5) are provided between all of the rolling stands (2, 3, 4).

3. A hot rolling mill according to claim 1, characterized in that distance between two stands (2, 3, 4) in the conveying direction amounts to less than 25 m, preferably, less than 7 m.

4. A hot rolling mill according to claim 1, characterized in that a region a length of which amounts to at least 25% of a distance (a) between two rolling stands (2, 3, 4), is provided with the at least one heat insulation element (5).

5. A hot rolling mill according to claim 1, characterized in that at least one heat insulation element (5) or a portion thereof is directly mounted on a rolling stand (2, 3, 4), or is integrated therein, or is mounted on a stand built-in.

6. A hot rolling mill according to claim 1, characterized in that between the at least one heat insulation element (5) and the rolled stock or next to the at least one heat insulation element (5), at least one protection element (6) is arranged.

7. A hot rolling mill according to claim 6, characterized in that the protection element (6) is connected with the heat insulation element (5).

8. A hot rolling mill according to claim 6, characterized in that a plurality of protection elements (6), which are connected with each other, are provided.

9. A hot rolling mill according to claim 6, characterized in that the at least one protection element (6) is formed of a heat-resistant material.

10. A hot rolling mill according to claim 6, characterized in that the at least one protection element (6) is provided with cooling.

11. A hot rolling mill according to claim 1, characterized in that the at least one heat insulation element (5) is supported for pivotal or translational movement.

12. A hot rolling mill according to claim 1, characterized in that a region between two rolling stands (2, 3, 4) is free of a roller table.

13. A hot rolling mill according to claim 1, characterized in that bridge table, guide table, and/or looper is provided in a region between two rolling stands (2, 3, 4).

14. A hot rolling mill according to claim 1, characterized in that the at least one heat insulation element (5) comprises a ceramic material or consist of one.

15. A hot rolling mill according to claim 1, characterized in that the at least one heat insulation element (5) is provided with a protective sheet (7) for protecting it from water.

16. A hot rolling mill according to claim 1, characterized in that the at least one heat insulation element is an absorption insulation element.

17. A hot rolling mill according to claim 1, characterized in that the at least one heat insulation element is a reflection insulation element.

18. A hot rolling mill according to claim 1, characterized in that insulation hoods within the finishing train are heated by pass-through or pre-rolled strips and, finally, temperature-critically strips (e.g., thin strips), which use the heated insulation hoods, are rolled.

19. A hot rolling mill according to claim 1, characterized in that operation of heat insulation hoods within the finishing train is determined based on a process model for setting the rolling train and/or dynamic change of temperature during the rolling process.

20. A hot rolling mill according to claim 1, characterized in that heat insulation within the finishing train is expressed at continuous rolling during product mass flow, in thickness×speed of less than 650 mm×m/min.

21. A hot rolling mill according to claim 20, wherein the mass flow is less than 500 mm×m/min.

22. A hot rolling mill, comprising a finishing train (1) for finish-rolling a rolled stock, in particular a strip, wherein the finishing train (1) has a number of rolling stands (2, 3, 4) following each other in a conveying direction (F) of the rolling stock, wherein
at least between two, following each other in the conveying direction (F), rolling stands (2, 3, 4), at least one heat insulation element (5) is arranged that can shield the rolled stock from heat losses,
characterized in that
air blow-off means and/or water spray-off means are (is) provided in a region of the at least one heat insulation element (5), and
in that between the at least one heat insulation element and the roll stock or next to the at least one heat insulation element, a plurality of protection elements (6) is provided, wherein the protection elements (6) which follow each other between the two stands (2, 3, 4) in the conveying direction, are offset relative to each other in a width direction of the rolled stock.

23. A hot rolling mill according to claim 22, wherein the protection elements are in form of ribs or strips.

24. A hot rolling mill according to claim 22, characterized in that the protection elements (6) extend linearly and/or form an angle ($\alpha$) in the conveying direction (F).

25. A hot rolling mill according to claim 24, wherein the angle ($\alpha$) amounts to form 0 to 45(°).

* * * * *